United States Patent [19]

Paris et al.

[11] Patent Number: 5,490,157
[45] Date of Patent: Feb. 6, 1996

[54] METHOD AND APPARATUS FOR MONITORING THE POWER OF A LASER BEAM

[75] Inventors: Robert D. Paris, San Ramon; Richard P. Hackel, Livermore, both of Calif.

[73] Assignee: The United States of Americas as represented by the United States Department of Energy, Washington, D.C.

[21] Appl. No.: 236,859

[22] Filed: May 2, 1994

[51] Int. Cl.[6] .................................................. H01S 3/30
[52] U.S. Cl. .................... 372/6; 372/23; 372/32; 372/29
[58] Field of Search ..................... 372/29, 30, 31, 372/32, 72, 70, 6, 38, 23

[56] References Cited

U.S. PATENT DOCUMENTS

| | | | |
|---|---|---|---|
| 4,860,295 | 8/1989 | Byer et al. | 372/70 |
| 5,025,448 | 6/1991 | Sudo et al. | 372/32 |
| 5,117,436 | 5/1992 | Hanson | 372/72 |
| 5,181,210 | 1/1993 | Chung et al. | 372/6 |
| 5,323,409 | 6/1994 | Laskoskie et al. | 372/29 |

OTHER PUBLICATIONS

Journal of the Optical Society of America—vol. 64, No. 6—Jun. 1974 "Scattering from side–illuminated clad glass fibers for determination of fiber parameters" L. S. Watkins—pp. 767–772.

Primary Examiner—Leon Scott, Jr.
Attorney, Agent, or Firm—Isabelle R. McAndrews; William C. Daubenspeck; William R. Moser

[57] ABSTRACT

A method for monitoring the power of a laser beam in real time is disclosed. At least one optical fiber is placed through the laser beam, where a portion of light from the laser beam is coupled into the optical fiber. The optical fiber may be maintained in a stationary position or moved periodically over a cross section of the laser beam to couple light from each area traversed. Light reaching both fiber ends is monitored according to frequency and processed to determine the power of the laser beam.

15 Claims, 3 Drawing Sheets

5,490,157

METHOD AND APPARATUS FOR MONITORING THE POWER OF A LASER BEAM

FIELD OF THE INVENTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates generally to a laser monitoring apparatus and to a method for monitoring the power of a laser beam in real time.

One way to monitor the power of a laser beam at any given point in time during its operation is to monitor the beam in its entirety, e.g., take the laser off line and measure the full power of the beam. Another way to monitor the beam, in real time, is to use relatively complicated beam splitters. Both of these approaches are often inappropriate and unsatisfactory for particular applications of a given laser beam. Prior laser monitoring methods yielded inaccurate measurements and compromised beam quality. The drawbacks to these prior monitoring systems could only be overcome through the use of expensive beam splitters. Moreover, it is difficult to intercept minute quantities of laser light using conventional beam splitters.

The present invention overcomes the aforementioned disadvantages by monitoring the power of a laser beam with an optical fiber, means for isolating a single frequency and means for monitoring the power of a single frequency. Light from the laser beam enters the optical fiber through a fiber wall rather than solely through a fiber opening once it is trapped or coupled into the fiber. Preferably, laser light impinges on the optical fiber in a direction normal to the fiber, whereupon part of the light is intercepted and coupled into the optical fiber. L. S. Watkins in "Scattering from Side-Illuminated Clad Glass Fibers for Determination of Fiber Parameters," *Journal of Optical Society of America*, Vol 64, No. 6 p. 67, discusses light scattering effects when a laser beam is directed perpendicular to the axis of a glass fiber.

The output beam of some lasers have a single frequency output, while other lasers have a multiple frequency output. Both types of lasers have practical applications.

SUMMARY OF THE INVENTION

In view of the foregoing, it is an object of the present invention to provide an uncomplicated and yet accurate method for monitoring the power of a laser beam in real time.

Another object of the present invention is to provide a real time laser power monitoring method that minimally interferes with the laser beam.

A further object of the invention is to monitor the power of a laser beam having a plurality of frequencies.

An additional object of the invention is to monitor the power of a laser beam based on the power of a single desired frequency of the laser beam.

The present invention provides a method for monitoring the power of a laser beam by placing an optical fiber through a laser beam to produce coupled light, and then monitor the power of the specific frequencies contained in the laser beam.

The present invention is a system for monitoring the power of a laser beam having a plurality of frequencies comprising at least one optical fiber, transporting means for transporting coupled light, isolating means for isolating a single frequency through either fiber end and means for monitoring the power of at least one frequency.

The present invention is also a system for monitoring the power of a laser beam comprising means for moving an optical fiber through several different areas of a portion of a laser beam, means for transporting coupled light from each different section to first and second fiber ends, means for isolating a single frequency from each fiber end and means for monitoring the light power emanating from each fiber end.

The present invention is suitable for monitoring the power of a variety of lasers having a variety of sizes and a variety of laser mediums. Lasers which may be monitored in accordance with the present invention include lasers producing light of substantially a single frequency or multiple frequencies. Suitable lasers include dye lasers, neodymium:YAG lasers, and copper vapor lasers. The invention may also be used to monitor the power of any laser which would continue to operate effectively despite the periodic removal of a minute quantity of light.

In a preferred embodiment, an optical fiber is configured to permit a portion of light from the laser beam to reach each fiber end. In this embodiment, appropriate filters are employed such that only a single frequency of light is monitored at a first fiber end, while a different single frequency of light is monitored at a second fiber end. In this manner, the power of each frequency may be ascertained under real time conditions. As a result, the power of the laser beam itself will be readily ascertainable without having to discontinue the operation of the laser.

Additional objects, advantages and novel features of the invention will be set forth in the description which follows. Other features will become apparent to those skilled in the art upon examination of the following description.

DETAILED DESCRIPTION OF THE INVENTION

The accompanying drawings illustrate an embodiment of the invention and, together with the description, serve to explain the principles of the invention.

The diameter of one specific kind of laser, copper vapor, can range in size from 2 cm to 8 cm. In smaller lasers (having a diameter of about 2 cm), the optical fiber is placed in a stationary position. A single reading of the output from such a small laser will accurately indicate the power profile of its entire laser beam, since the power remains uniform across the entire beam despite changes in laser power.

Larger laser beams (those approaching 8 cm in diameter possess significantly more spatial intensity fluctuations then do smaller diameter lasers. Consequently, in larger lasers, certain areas of the laser beam are significantly more power intensive than others. Therefore, a single reading by a stationery optical fiber in a large laser beam is likely to yield inaccurate information about the total power for such a laser. To accurately measure the diverse intensity profile of large laser beams, a series of measurements taken at various locations across the beam is necessary to precisely calculate the total power.

Lasers having more than two principal frequencies may also be monitored by using a second optical fiber and suitable means for isolating the different frequencies. Preferably, the different frequencies are selectively isolated using filters.

The monitoring method in accordance with the present invention utilizes an optical fiber having a first and a second end. A lengthwise segment of the optical fiber is placed through the laser beam to couple a portion of light from the laser beam and transport the coupled light to each of the fiber ends. The amount of light of each frequency reaching either fiber end has a power that is linearly proportional to the power of the respective frequency in the laser beam at any given time during operation of the beam.

Filters positioned at each end of the optical fiber isolate light of a single frequency to thereby selectively allow penetration of light of a single frequency through the first fiber end, where it is processed to indicate the power of the laser beam. In this way, the power of the laser beam can be monitored in real time.

Reference will now be made in detail to specific embodiments of the invention, an example of which is illustrated in the accompanying drawings. The discussion of preferred embodiments of the invention is not intended to limit the invention to those particular embodiments. On the contrary, the following detailed description is intended to cover all alternatives, modifications and equivalents encompassed by the spirit and scope of the invention as defined by the appended claims.

Figure 1:
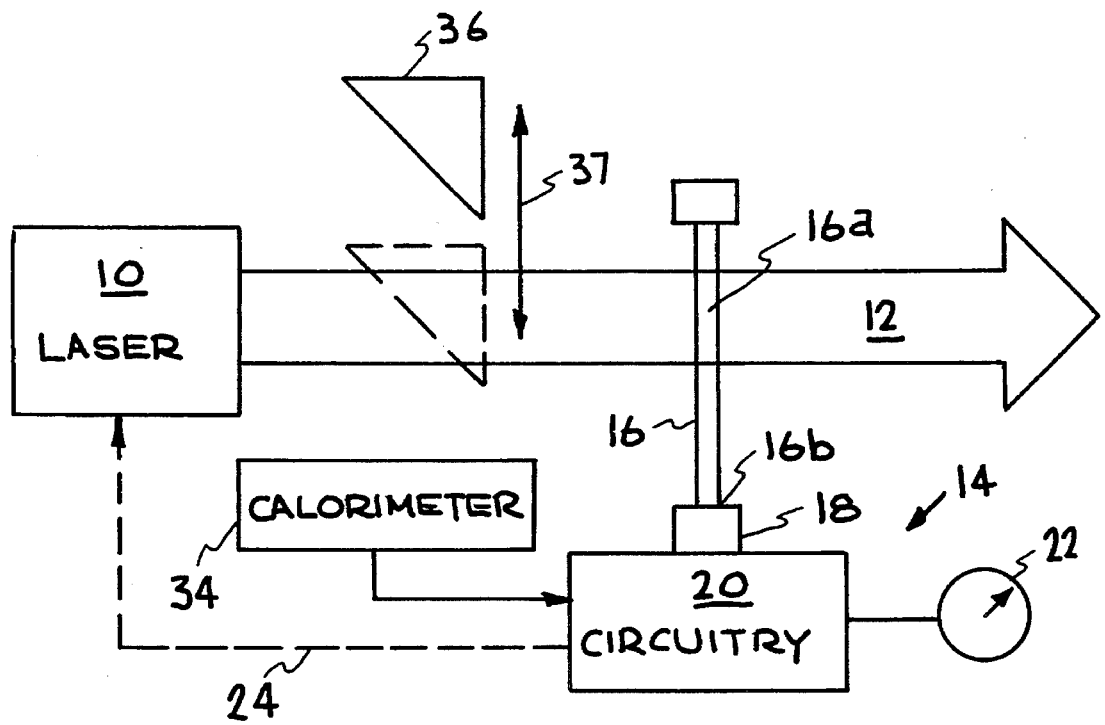
FIG. 1 is a diagram of a laser apparatus and a system for monitoring the power of the laser beam produced in real time.

FIG. 1 illustrates a commercially available laser apparatus 10 for producing a laser beam 12, and system 14 of the present invention for monitoring the power of laser 12 in real time. This system includes an optical fiber that is capable of coupling a portion of the light from laser beam 12 into an optical fiber. A portion of the light so coupled is transported to the fiber ends thereof.

Optical fibers suitable for practicing the present invention include conventional optical fibers which are readily available. One such optical fiber is manufactured by 3M Specialty Fiber Optics under the name GLPL Glass/Glass Fiber. This particular optical fiber is a glass-on-glass fiber having an inner core of approximately 1000 μm diameter, which is surrounded by an outer cladding. The total diameter of the glass-on-glass fiber is approximately 1250 μm. It is understood that other types of optical fibers of larger or smaller dimensions may be used. In the event that the optical fiber includes an outer protective cover, for example silicone, the cover must be peeled away or otherwise removed along lengthwise segment 16A.

The optical fiber, generally indicated at 16 in FIG. 1, is supported by suitable means (described below in conjunction with FIG. 3) so that a lengthwise segment 16A preferably extends across laser beam 12 transverse to the beam's axis. The optical fiber is positioned so that its axis is not parallel to the axis of the laser beam. In an alternative embodiment, lengthwise segment 16A may extend through the beam at an acute angle, thereby exposing more of the fiber to the beam. In either case, a lengthwise segment of the optical fiber preferably extends through the center of the beam, along the beam's diameter (in the case of a beam having a circular cross section). Having the lengthwise segment 16A extend through the beam diameter is especially significant when the cross-sectional power of the laser beam is not uniform.

Figure 2:
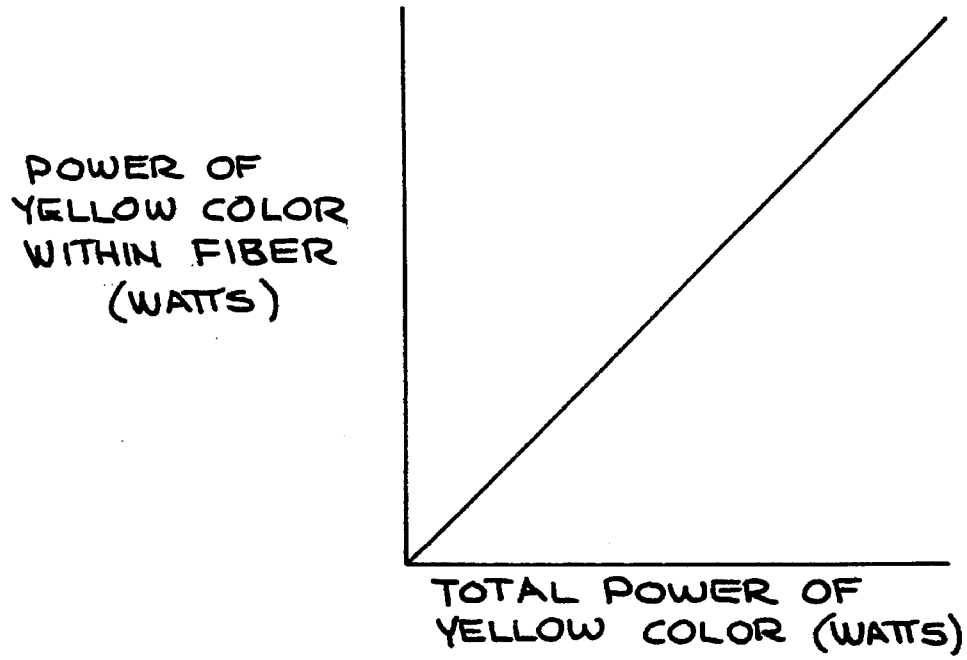
FIG. 2 is a graph of the power of a typical color, say yellow within a fiber versus total power of yellow color within the laser beam.

With the lengthwise segment of optical fiber 16 positioned across laser beam 12, a very small portion of the light from the laser beam, approximately 0.00001 percent, is coupled into the fiber through lengthwise segment 16A. This light is transported by the fiber to a first fiber end, for example 16B. In terms of power, the amount of light of each frequency reaching fiber end 16B is linearly proportional to the power of that frequency in the laser beam at any given time during operation of the beam (that is, in real time). A graphical representation of the linear proportionality relationship for yellow color is shown in FIG. 2, where the horizontal axis represents the overall power of the yellow color in watts, and the vertical axis represents the yellow power within fiber 16 reaching fiber end 16B.

The yellow color of the light is coupled into fiber 16 from section 16A, and upon reaching fiber end 16B is, in terms of power, linearly proportional to the yellow power of laser beam 12. The same proportionality relationship is also true for other color portions of the beam.

The overall monitoring system 14 includes a suitable and commercially available transducer for converting the light at fiber end 16B to a corresponding electrical signal. A suitable transducer consists of a photodetector. Output signals from the transducer are processed by suitable circuitry 20 to provide a monitoring system that can determine the power of laser beam 12 at any point in time during operation of the laser beam (that is, in real time). Circuitry 20 averages a plurality of pulses from the laser beam and converts the pulse to DC current using resistors and capacitors. The resulting output signal (i.e., monitoring signal) may be used to drive a readout display 22, to drive a printer (not shown) and/or to produce feedback signals for use in controlling the power of beam 12, as indicated by the dotted lead line 24 which feedbacks into laser apparatus 10.

In order to produce a monitoring signal responsive to the light at fiber end 16B, the overall monitoring system 14 must be initially calibrated. To calibrate monitoring system 14, it is necessary to determine the strength of the laser at a given power, such as full power, and to determine the strength of the transduced signal at full laser power or whatever power is selected for determining the power strength of the laser. With this information, the particular linear relationship between laser power and signal pickup at transducer 18 can be determined. The transducer may be selected from a photodetector or other suitable means. However, the transducer is preferably a silicon photodetector. Circuitry 20 may also be appropriately adjusted to provide a reliable representative monitoring signal for driving a visual component such as a monitor 22, a printer or any other similar device. Both the transducer 18 and the circuitry 20 are readily available.

In the situation where only one frequency is being monitored, the optical fiber may be suspended at one fiber end. In this embodiment, fiber end 16C should be covered with suitable means 32 to prevent ambient light from entering the optical fiber. Preferably, fiber end 16C is covered with means composed of light-impervious material, such as a cap. The amount of light that might otherwise enter through fiber end 16C could be significant, and thereby affect the optical signal at fiber end 16B. On the other hand, any ambient light that might couple into a lengthwise segment of the optical fiber would be substantially less than the coupled light entering from laser 12. Hence, the risk of ambient light impairing the optical signal is relatively insignificant.

FIG. 1 also illustrates a preferred embodiment for calibration using a conventional calorimeter generally indicated at 34 and a commercially available beam diverter generally indicated at 36.

The beam diverter is suitably mounted to move into and out of the laser beam 12 as indicated by two-way arrow 37. The beam diverter's reciprocal movement periodically and momentarily redirects the entire beam into calorimeter 34, where a precise reading of the beam power is taken. About the time of the calorimeter reading, a reading of coupled light appearing at fiber end 16B is taken by system 14. With these two readings (obtained by calorimeter 34 and system 14), system 14 can be calibrated. In the case where either yellow or green light is being monitored, the slope of its linearity can be readily determined on a regular basis. Upon calibrating system 14, the linearity of its coupled signal remains stable in the short term. However, in certain lasers, periodic calibration may be required on a daily or on an hourly basis, in order to obtain reliable monitoring data. Hence, the calibrating technique is an important part of the overall monitoring process.

Figure 3:
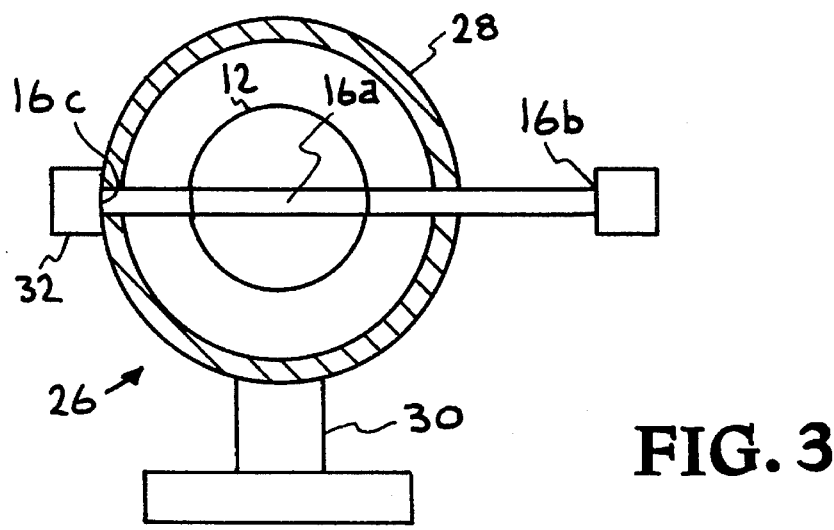
FIG. 3 is an elevational view of means for supporting an optical fiber.

Turning to FIG. 3, attention is directed to supporting means 26 for supporting a lengthwise segment of optical fiber 16 across laser beam 12. The supporting means includes a support ring 28 mounted on top of a stand 30. The support ring is designed to be substantially larger in diameter than the diameter of laser beam 12 to facilitate passage of the beam through the support ring. Fiber end 16C, opposite fiber end 16B, is supported by suitable means across support ring 28 and maintained in this position so that section 16A can be readily positioned across the laser beam.

To effectively monitor the output beam of a large laser, several measurements of different sections of the laser beam are taken to accurately determine the overall laser power. The system for monitoring the power of a large laser beam comprises an optical fiber having a lengthwise segment capable of coupling a portion of light from said laser beam for transporting a portion of coupled light toward the fiber ends; means for isolating a single frequency at each fiber end; means for monitoring the power of a first single frequency of light reaching a first fiber end, while simultaneously monitoring the power of a second single frequency of light reaching a second fiber end; and means for moving said optical fiber so that the lengthwise segment interacts with a different area of said laser beam.

The method for operating a system which monitors the power of a large laser beam comprises the steps of:

(a) providing a monitoring system having at least one optical fiber having a first and second fiber end;

(b) providing a laser beam having at least a first frequency of light;

(c) placing said optical fiber through a portion of said laser beam to produce coupled light in said optical fiber;

(d) transporting part of said coupled light from said different area to said first and second fiber end;

(e) obtaining a first output signal from a first frequency of light reaching said first fiber end;

(f) processing said first output signals;

(g) moving said optical fiber to go through a different area of said portion of said laser beam to produce an additional output signal;

(h) processing the additional output signal; and (i) repeating steps (e) through (h) until a plurality of areas within said portion of said laser beam has been scanned to thereby determine the power of the laser beam.

For laser beams containing two frequencies of light, the above method of the invention may be modified as follows. The second frequency of light is transported to said second fiber end, whereupon a second output signal (corresponding to the second frequency) is generated. The second output signal may be generated simultaneously with said first output signal. The two output signals are then processed and the optical fiber is moved to a different area of the laser beam. Thereafter, a new set of output signals are produced which correspond to the power level of said different area.

The system and method for monitoring the power of a large laser beam will operate successfully regardless of whether the laser beam is principally composed of a single frequency or a plurality of frequencies. In fact, it is occasionally desirable to monitor two different frequencies of a laser beam. Thus, in the case of a copper vapor laser beam, it would be desirable to monitor the frequencies corresponding to green and yellow colors.

Figure 4:
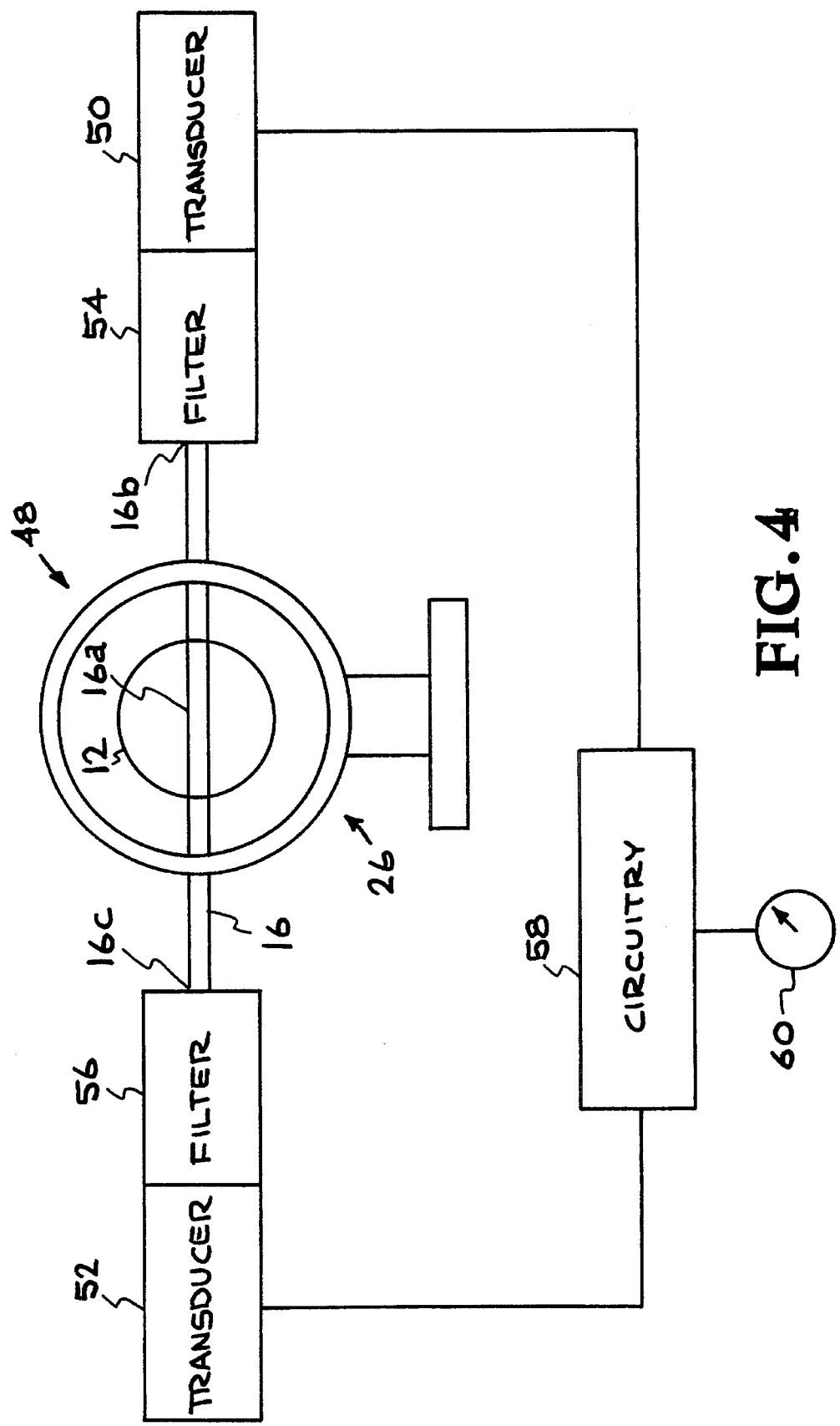
FIG. 4 illustrates a second embodiment of the laser power monitoring system for monitoring the power of a laser beam having multiple frequencies.

FIG. 4 illustrates a monitoring system 48 that monitors light of two different frequencies. System 48 includes an optical fiber 16 having a lengthwise segment 16A; a support stand 26 for maintaining the lengthwise segment 16A across beam 12; means for isolating a single frequency of light 54 and 56, such as a filter; transducers 50 and 52; and electronic circuitry 58 for processing the converted signals. Optical fiber ends 16B and 16C are connected to the inputs of their respective transducers 50 and 52 (these transducers correspond to previously discussed transducer 18) through filters 54 and 56, respectively.

Laser beam 12 is preferably a copper vapor laser beam. System 48 monitors the respective power of the green and yellow components in a copper vapor laser beam by using filters or the like. Filter 54 isolates yellow light frequency, while filter 56 isolates the frequency corresponding to green light. Light coupled into lengthwise segment 16A will travel to each fiber end 16B and 16C, with more coupled light reaching one end. Nevertheless, it has been found that each filtered light frequency which is coupled and reaches a fiber end is linearly proportional to the power of the same frequency of light in the laser beam itself. Thus, the two transducers 50 and 52 provide output signals corresponding to their respective frequencies. These output signals are processed by circuitry 58 in the same manner as previously discussed for circuitry 20.

Figure 5:
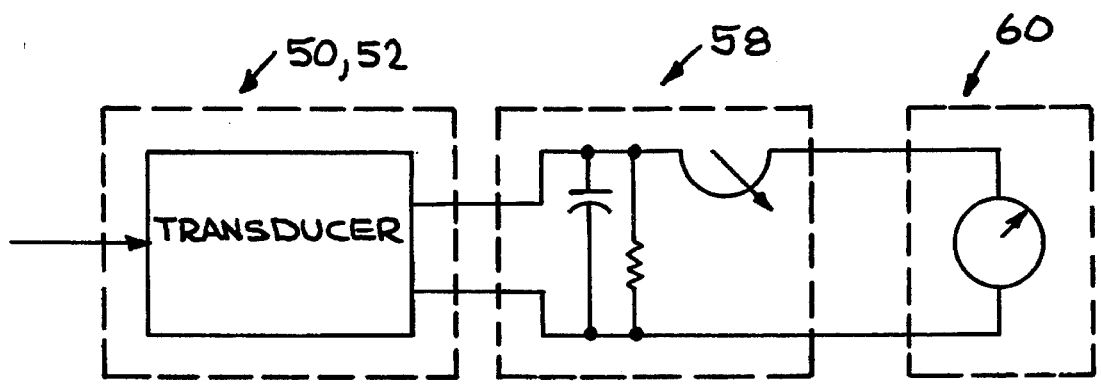
FIG. 5 is one possible circuit which may be used to practice the invention.
Figure 6:
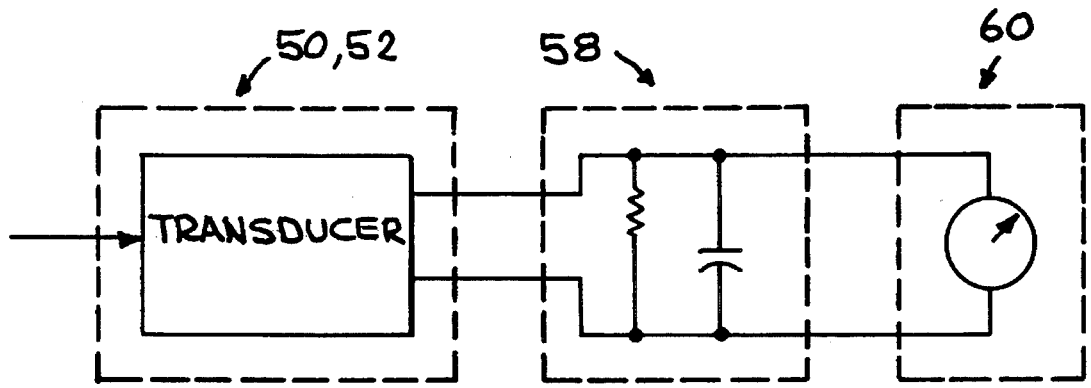
FIG. 6 is a simplified version of the circuit shown in FIG. 5.

Circuitry 58 may include suitable circuit means to combine the two different frequencies so as to provide a readout generally indicated at 60 that will correspond to the total power of beam 12. One possible circuit for converting the transducer output of the present invention into a signal to be displayed on a readout is shown in FIG. 5. A simplified version of the circuit of FIG. 5 is shown in FIG. 6.

An alternative embodiment of the invention includes providing individual monitoring devices, not shown, may be provided for each of the frequencies being monitored. In addition, the output signal from circuitry 58 can be used in a feedback scheme to control operation of the laser itself, as described above in conjunction with system 14. Further, while not shown, monitoring system 48 can be calibrated using a calorimeter and a beam diverting device similar to calorimeter 34 and beam diameter 36 of system 14.

To determine the power of each frequency comprising the laser beam, system 48 must be calibrated. Calibration will assure an accurate assessment of the power of the principal frequencies only if measurements for each frequency are performed. These measurements may be taken periodically in the same manner as described with reference to the calibration of monitoring system 14.

in system 48, a lengthwise segment of optical fiber 16 is supported across laser beam 12 in the same manner as illustrated in FIG. 4. The same support stand 26 illustrated in FIG. 3 can be provided for this purpose. However, in the case of system 48, fiber end 16C need not be covered, but instead may extend from support stand 26 to transducer 52 and filter 56.

The foregoing description of the invention has been presented for purposes of illustration and is not intended to be exhaustive or to limit the invention to the precise embodiments disclosed. Obviously many modifications and variations to the embodiments are possible. The embodiments were chosen and described in order to explain the principles of the invention and to thereby enable others skilled in the art to utilize the invention.

What is claimed is:

1. A method for monitoring the power of a beam of laser radiation comprising the steps of:
   (a) inserting an optical fiber in the path of a beam of laser radiation, said optical fiber having a lengthwise surface extending between a first end surface arid a second end surface and having an inner core, said optical fiber being of a type in which at least a portion of a beam of laser radiation impinging on the lengthwise outer surface is coupled into the inner core, said optical fiber being oriented so that said beam of laser radiation impinges on at least a portion of the lengthwise outer surface so that a portion of said beam of laser radiation that impinges on said at least a portion of the lengthwise outer surface is coupled into the inner core; and
   (b) measuring the power of said portion of said beam of laser radiation coupled to said inner core through said lengthwise outer surface, whereby the power of the laser radiation coupled to said inner core is proportional to the power of the beam of laser radiation.

2. The method of claim 1 wherein the step of measuring comprises:
   measuring the power of said beam of laser radiation coupled via said inner core to at least one of said first end surface or said second end surface.

3. The method of claim 2 wherein the step of inserting an optical fiber in the path of a beam of laser radiation includes:
   said optical fiber being oriented transverse to the beam of laser radiation.

4. The method of claim 1 further including the steps of:
   periodically directly measuring the power of the beam of laser radiation; and
   determining the relationship of the measured power of said beam of laser radiation coupled to said inner core to said directly measured power of the beam of laser radiation.

5. The method of claim 1 wherein said step of inserting an optical fiber in the path of a beam of laser radiation includes;
   inserting an optical fiber in the path of a beam of laser radiation at more that one location in the beam of laser radiation; and measuring the power of said beam of laser radiation coupled to said inner core at each such location.

6. The method as recited in claim 1 wherein said beam of laser radiation comprises a beam of radiation having more than one frequency of radiation and wherein said step of measuring the power of said beam of laser radiation coupled to said inner core further comprises the step of:
   measuring the power of said beam of laser radiation coupled to said inner core at each said more than one frequency of radiation.

7. The method of claim 1 further including the step of:
   controlling the power of said beam of laser radiation by maintaining the measured power of said portion of said beam of laser radiation coupled to said inner core at a predetermined level.

8. A method for monitoring the power of a beam of laser radiation comprising the steps of:
   (a) inserting an optical fiber in the path of a beam of laser radiation, said optical fiber having a lengthwise surface extending between a first end surface and a second end surface and having an inner core, said optical fiber being of a type in which at least a portion of a beam of laser radiation impinging on the lengthwise outer surface is coupled into the inner core, said optical filter being oriented so that said beam of laser radiation impinges on said optical fiber so that a portion of said beam of laser radiation is coupled into the inner core only through said at least a portion of the lengthwise outer surface; and
   (b) measuring the power of said portion of said beam of laser radiation coupled to said inner core through said lengthwise outer surface, whereby the power of the laser radiation coupled to said inner core is proportional to the power of the beam of laser radiation.

9. The method of claim 8 further including the steps of:
   at least once directly measuring the power of the entire beam of the laser radiation; and
   determining the relationship of the measured power of said portion of said bean of laser radiation coupled to said inner core to said directly measured power of the entire beam of laser radiation to calibrate the relationship of the measured power of said portion of said beam of laser radiation coupled to said inner core to the measured power of the entire beam.

10. The method of claim 9 further including the step
   controlling the power of said beam of laser radiation by maintaining the measured power of said portion of said beam of laser radiation coupled to said inner core at a predetermined level.

11. Apparatus for monitoring the power of a beam of laser radiation comprising:
   an optical fiber having a lengthwise outer surface extending between a first end surface and a second end surface and having an inner core, said optical fiber being of a type in which at least a portion of a beam of laser radiation impinging on the lengthwise outer surface is coupled into the inner core;
   means for disposing said optical fiber in said beam of laser radiation, said optical fiber being oriented so that said beam of laser radiation impinges on said optical fiber on at least a portion of the lengthwise outer surface, whereby a portion of said portion of beam of laser radiation impinging on said lengthwise outer surface is coupled into said inner core; and means for measuring the power of said portion of said portion of said beam of laser radiation coupled to said inner core, whereby the power of the laser radiation coupled to said inner core is proportional to the power of the beam of laser radiation.

12. Apparatus as recited in claim 11 wherein said means for disposing said optical fiber includes:

means for disposing said optical fiber in more than one location in said beam of laser radiation.

13. Apparatus as recited in claim 11 further comprising means for controlling the power of said beam of laser radiation to maintain the power coupled to said inner core to a predetermined level.

14. Apparatus as recited in claim 11 wherein said means for measuring the power of said portion of said portion of said beam of laser radiation coupled to said inner core includes means for measuring the power of said portion of said beam of laser radiation coupled to said inner core at more than one frequency.

15. Apparatus as recited in claim 11 wherein said beam of laser radiation includes more than one frequency and said means for measuring the power of said portion of said beam of laser radiation coupled to said inner core includes means for measuring the power of said portion of said portion of said beam of laser radiation coupled to said inner core at each of said more than one frequency.

* * * * *